Feb. 17, 1942.    O. H. PADDOCK    2,273,733
SEAL FOR DOUBLE-WALLED GLASS UNITS
Filed June 26, 1940

Inventor
ORMOND H. PADDOCK.
By
Frank Fraser
Attorney

Patented Feb. 17, 1942

2,273,733

UNITED STATES PATENT OFFICE 2,273,733

SEAL FOR DOUBLE-WALLED GLASS UNITS

Ormond H. Paddock, Rossford, Ohio, assignor to Libbey-Owens-Ford Glass Company, Toledo, Ohio, a corporation of Ohio Application June 26, 1940, Serial No. 342,499

11 Claims. (Cl. 20—56.5)

The present invention relates broadly to the sealing of double-walled glass units of the type including two sheets or plates of glass arranged in spaced substantially parallel relation, and more particularly to the provision of an improved seal for the edges of such units.

Although the invention is not restricted to use in the sealing of any particular type or types of glass units, it has been illustrated in the accompanying drawing and will be hereinafter described by way of example as applied to units of the general character disclosed in U. S. Patents No. 2,011,252 and No. 2,030,869. The unit disclosed in Patent No. 2,011,252 consists briefly of two spaced parallel sheets or plates of glass, either flat or curved, having arranged therebetween a layer or mat of loose glass threads held solely by friction between the glass surfaces. This type of unit has excellent sound insulating and light diffusing properties and may be used as a window pane, in partition walls, etc. Such a unit is produced commercially by the assignee of the present application under the trade-name "Thermolux." On the other hand, the unit disclosed in Patent No. 2,030,869 consists of two sheets or plates of glass secured in spaced parallel relation by separator means arranged between said sheets or plates around the marginal portions thereof to provide a hermetically sealed space therebetween. A unit of this type is also produced by the assignee company under the trade-name "Thermopane" and is adapted to be employed wherever double glazing is desired to reduce heat transfer and prevent condensation of moisture upon glass in glazed openings.

An important object of this invention is to provide an improved plastic material for sealing the edges of glass units of the above character whereby to render the space between the glass sheets or plates both air-tight and moisture-tight and prevent the ingress of dirt and dust such as might adversely affect the appearance or cleanliness of the inner surfaces of said sheets or plates.

Another important object of the invention is the provision of an improved plastic sealing material which has exceptionally good adhesion to the glass sheets or plates to secure them firmly together and which will also effectively withstand weathering, including sudden and drastic changes in temperature, as well as the action of oils, putties, etc., ordinarily used in the glazing of such units.

A further important object of the invention is the provision of an improved plastic sealing material which is stable; flexible; impervious to moisture; possessing sufficient ductility and elasticity to accommodate relative expansion and contraction of the glass due to temperature variations; which at the maximum temperatures to which it is subjected will not be too soft and which at minimum temperatures will not crystallize or become brittle; and which may be used over a relatively long period of time without deterioration.

Other objects and advantages of the invention will become more apparent during the course of the following description, when taken in connection with the accompanying drawing.

In the drawing, wherein like numerals are employed to designate like parts throughout the same;

Figure 1:
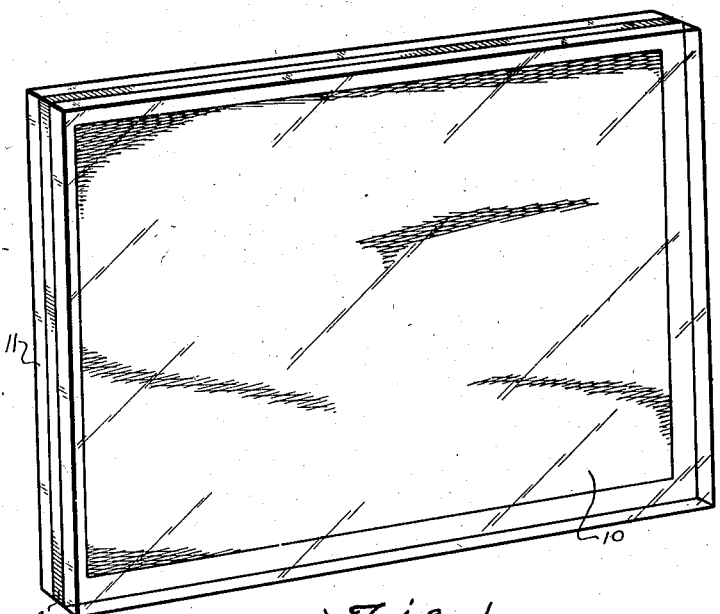
Fig. 1 is a perspective view of one type of double-walled glass unit marginally sealed with the improved sealing material provided by the present invention.

The improved sealing material provided by the present invention comprises a plastic adhesive compound composed of two basic ingredients, namely, a rubber (latex) paste and a dehydrating powder. The concentrated latex paste and powder are separately prepared and then mixed together in predetermined proportions to form a plastic mix of the desired consistency. The dehydrating powder is in the form of a self-setting cement which sets up upon absorption of the water from the latex paste. The consistency of the adhesive is dependent upon the proportions of paste and powder used and may be varied over a relatively wide range. As the mixture herein provided loses its ability to flow freely in about forty-five minutes, the paste and powder should not be mixed with one another until it is desired to make use of the material.

Broadly stated, the paste comprises a specially prepared latex of high but variable concentration having a low protein content which is suitably stabilized and preserved by a relatively small amount of ammonia as well as by the use of caustic alkali. As a specific example, one form of paste which I have used with good results is a concentrated latex paste having a dry rubber content of approximately 68% to 70% and will also ordinarily contain other solid materials amounting to approximately 1.5%. These solids, other than the dry rubber, which constitute the 1.5% are caustic alkali as well as naturally occurring proteins which are always found in latex. The proportions of these ingredients are approximately in the ratio of 0.8% protein material to 0.7% of caustic alkali calculated as potassium hydroxide. The balance of the paste consists of water containing a relatively small amount of ammonia which may be approximately 0.05%.

Summarizing and by way of example, this paste comprises the following ingredients in the approximate proportions given:

| | Per cent |
|---|---|
| Dry rubber | 68.45 |
| Water | 30 |
| Ammonia | 0.05 |
| Natural proteins | 0.8 |
| Caustic alkali (KOH) | 0.7 |

The powder consists almost entirely of a high alumina cement that sets by hydration. To this high alumina cement are added suitable and variable amounts of sulfur or other vulcanizing agents such as selenium, etc. Also, to the powder is added suitable accelerators capable of bringing about vulcanization without the application of heat such as "Butyl Zimate," zinc butyl xanthate, etc. It is likewise desirable to add to the powder in variable proportions, suitable antioxidants such as "Age-rite White," phenyl beta naphthylamine, indanyl resorcinol (sold in the trade as RR5), etc.

More particularly, the powder is composed of inorganic and organic materials, with the inorganic material comprising approximately 98% of the powder. An analysis of one form of powder used by me with excellent results in conjunction with the concentrated latex paste described above shows the inorganic material to consist of:

| | Per cent |
|---|---|
| A. Powdered sulfur | 1.0 |
| B. High alumina cement | 97.0 |
| Chemical composition of typical high alumina cement: | |
| Silica ($SiO_2$) | 4.92 |
| Iron oxide ($Fe_2O_3$) | 18.2 |
| Alumina ($Al_2O_3$) | 39.17 |
| Calcium oxide (CaO) | 36.03 |
| Magnesia (MgO) | 1.54 |
| Sulfuric anhydride ($SO_3$) | .14 |

The organic constituents of the powder, which comprise an accelerator and an antioxidant, constitute substantially 2% of the powder and should be present in approximately the following proportions:

| | Per cent |
|---|---|
| Accelerator (zinc di-n-butyldithiocarbamate) * | 0.5 |
| Antioxidant ($N,N^1$ di-beta-naphthyl-p-phenylenediamine) ** | 1½ |

The composition of the powder may be summarized as follows:

| | |
|---|---|
| High alumina cement, the analysis of which is given above | 97.0 |
| Sulfur | 1.0 |
| Accelerator ("Butyl Zimate") | .5 |
| Antioxidant ("Age-rite White") | 1.5 |

\*This accelerator is sold in the trade under the name of "Butyl Zimate."
\*\*This antioxidant is sold in the trade under the name of "Age-rite White."

In preparing the sealing material, it is preferable that the powder be mixed into the paste with a slow, uniform motion that tends to crush any powder lumps. This may be done in a hand operated mixer, a power driven mixer, or by other suitable means. The mixing of the paste and powder is also preferably carried out in a vacuum to rid the mix of entrapped air whereby to eliminate voids or large bubbles therein. This may be effected by mixing the paste and powder in a closed container having means associated therewith for exhausting the air therefrom. In this way, a plastic sealing material having a minimum number of small air pockets can be obtained. The vacuum may be applied throughout or at the end of the mixing operation and while not limited to any particular amount of vacuum, it is suggested that the mixture be subjected to approximately 10 inches of vacuum. After the paste and powder have been mixed in this manner the material is ready for use.

Figure 2:
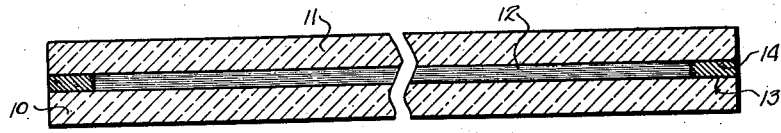
Fig. 2 is a transverse sectional view therethrough.

With reference now to the drawing and particularly to Figs. 1 and 2 there is illustrated a double-walled glass unit comprising two spaced parallel sheets or plates of glass 10 and 11 having arranged therebetween a layer or mat of glass threads 12 of predetermined thickness. The layer of glass threads is loosely positioned between the glass sheets in that it is not cemented or otherwise secured to the glass surfaces. The layer of glass threads is also cut relatively smaller than the glass sheets 10 and 11 and associated therewith in a manner to provide a relatively narrow channel 13 between the sheets around the marginal portions thereof. Received within the channel 13 is the special sealing material 14 above described which serves not only to secure the glass sheets firmly together but also acts as a separator to maintain the sheets in properly spaced relation.

This type of unit has been found to have especially good sound insulating and light diffusing properties and may be used either as a window pane, as the light transmitting element of a partition wall or for any analogous purpose. The glass sheets may be either of clear transparent glass or a translucent glass and the glass threads may be of either clear glass or colored. Throughout the specification and claims the term "glass threads" is to be understood as including glass wool, woven glass fabrics, and similar materials.

In sealing a unit of this character with the plastic sealing material above described, a predetermined amount of the dehydrating powder and concentrated latex paste above described are first mixed together to give a mixture of the desired consistency. After being properly mixed, the sealing material is applied within the channel 13 around the edges of the unit in any desired manner; one method and apparatus for performing this operation being disclosed in the application of William T. Rathbun and John N. Keller, Serial No. 234,476, filed March 18, 1940. The unit is preferably arranged in a horizontal position during the application of the sealing material. As stated above, the sealing material herein provided is a self-setting material and has a working time of about forty-five minutes after being mixed. However, it does not develop an initial set until about four hours old and good strength or bond is ordinarily developed by the seventh day. Curing of the sealing material continues up until about the fourteenth day when maximum strength has developed.

It is of course desirable to suit the consistency of the mixture to the particular sealing operation so that the mixture does not flow into the glass mat 12 or out of the channel 13. It has been found desirable to vary the mix according to the size of unit to be sealed, as the weight of the top sheet of glass affects workability and neatness of the seal when the unit is sealed in a horizontal position. For instance, it has been found that the mix can be varied with satisfactory results from approximately 8.5 parts powder to 5 parts paste by weight for units of about one square foot to approximately 7.5 parts powder to 5 parts paste by weight for units of about nine square feet and larger. Varying the mix, and therefore the consistency, however, does not alter the properties of the material.

The plastic adhesive material above described forms a highly satisfactory and effective seal for glass units of this character. The sealing material not only possesses excellent adhesion to the glass surfaces whereby to firmly secure the sheets together but is also impervious to moisture as well as being flexible and elastic under excessive and prolonged strain or straining thereby minimizing danger of break-down of the bond between the seal and glass surfaces under the varying atmospheric conditions to which the unit may be subjected in actual use.

Upon setting of the sealing material, there is a tendency for it to undergo a certain amount of shrinkage or contraction and which characteristic is of decided advantage in the type of unit illustrated in Figs. 1 and 2. Thus, upon shrinkage of the seal 14, the glass sheets 10 and 11 will be drawn closer together whereby to more firmly clamp the layer of glass threads 12 therebetween. Also, upon shrinkage of the sealing material, the ends of the layer of glass threads 12 adhering thereto will be stretched resulting in the elimination of wrinkles and the provision of a glass mat having a smooth appearance. Further, the adherence of the glass threads to the sealing material will result in the glass mat being more securely held in place between the glass sheets so that danger of slippage thereof will be reduced to a minimum.

Figure 3:
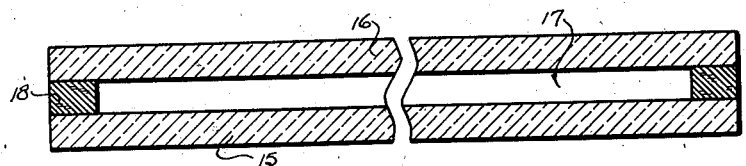
Fig. 3 is a transverse sectional view of another type of glass unit also marginally sealed according to the invention.

In Fig. 3 is illustrated another type of double-walled glass unit sealed with the improved sealing material herein provided. This unit comprises two sheets of glass 15 and 16 spaced from one another to provide a dead air space 17 therebetween. Arranged between the glass sheets around the marginal portions thereof is a seal 18 formed of the material above described for securing the sheets together in a manner to hermetically seal the space 17 therebetween.

Figure 4:
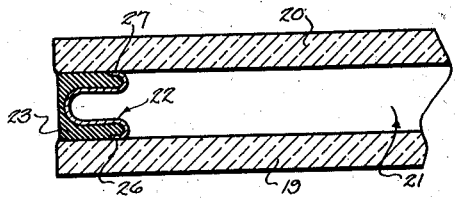
Fig. 4 is a transverse sectional view through still another form of glass unit sealed according to the invention.
Figure 5:
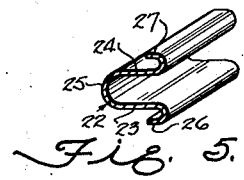
Fig. 5 is a perspective view of the spacer means employed between the glass sheets in Fig. 4.

In Figs. 4 and 5 is shown another form of double glazing unit comprising two sheets of glass 19 and 20 spaced from one another to provide the dead air space 21 therebetween. Arranged between the two sheets of glass around the marginal portions thereof is a metal spacer member designated in its entirety by the numeral 22, said spacer being constructed and associated with the glass sheets to provide a channel therebetween around the edges thereof and within which is arranged the sealing material 23 above described. Due to the contraction or shrinkage of the sealing material upon setting, it is preferred that the spacer 22 be of a yieldable or spring construction so that it will readily "give" to accommodate the shrinkage of the sealing material. To this end, the spacer 22 disclosed comprises a substantially U-shaped channel portion comprising the spaced substantially parallel side walls 23 and 24 connected by the integral end wall 25. The outer marginal portions of the side walls 23 and 24 are bent upon themselves to form the flanges 26 and 27 respectively which are adapted to engage the inner surfaces of the glass sheets 19 and 20 as clearly shown in Fig. 4. The flanges 26 and 27, however, are not adapted to be secured to the glass sheets. Because of the spring-like action of the spaced walls 23 and 24 of the spacer member 22 the said walls will be drawn together by the action of the sealing material upon contraction or shrinkage thereof.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A double-walled glass unit including two sheets of glass arranged in spaced substantially parallel relation and having arranged therebetween a layer of glass threads in contact with the adjacent sheet surfaces and associated with said sheets to provide a channel around the edges of the unit, and a plastic sealing material inserted within said channel and engaging the peripheral edges of the layer of glass threads, comprising a concentrated latex paste and a dehydrating powder mixed together in predetermined portions to provide a self-setting plastic compound of the desired consistency.

2. A double-walled glass unit including two sheets of glass arranged in spaced substantially parallel relation and having arranged therebetween a layer of glass threads in contact with the adjacent sheet surfaces and associated with said sheets to provide a channel around the edges of the unit, and a plastic sealing material inserted within said channel and engaging the peripheral edges of the layer of glass threads, comprising a concentrated latex paste and a high alumina cement powder that sets by hydration mixed together in predetermined portions to provide a self-setting plastic compound of the desired consistency.

3. A double-walled glass unit including two sheets of glass arranged in spaced substantially parallel relation and having arranged therebetween a layer of glass threads in contact with the adjacent sheet surfaces and associated with said sheets to provide a channel around the edges of the unit, and a plastic sealing material inserted within said channel and engaging the peripheral edges of the layer of glass threads, comprising a concentrated latex paste having a dry rubber content of approximately 68% to 70% and a dehydrating powder mixed together in predetermined proportions to provide a self-setting plastic compound of the desired consistency.

4. A double-walled glass unit including two sheets of glass arranged in spaced substantially parallel relation and having arranged therebetween a layer of glass threads in contact with the adjacent sheet surfaces and associated with said sheets to provide a channel around the edges of the unit, and a plastic sealing material inserted within said channel and engaging the peripheral edges of the layer of glass threads, comprising a concentrated latex paste and a cement powder that sets by hydration having an alumina content of approximately 97% mixed together in predetermined proportions to provide a self-setting plastic compound of the desired consistency.

5. A double-walled glass unit including two sheets of glass arranged in spaced substantially parallel relation and having arranged therebetween a layer of glass threads in contact with the adjacent sheet surfaces and associated with said sheets to provide a channel around the edges of the unit, and a plastic sealing material inserted within said channel and engaging the peripheral edges of the layer of glass threads, comprising a concentrated latex paste having a dry rubber content of approximately 68% to 70% and a cement powder having an alumina content of approximately 97% mixed together in predetermined proportions to provide a self-setting plastic compound of the desired consistency.

6. A double-walled glass unit including two sheets of glass arranged in spaced substantially parallel relation and having arranged therebetween a layer of glass threads in contact with the adjacent sheet surfaces and associated with said sheets to provide a channel around the edges of the unit, and a plastic sealing material inserted within said channel and engaging the peripheral edges of the layer of glass threads, comprising a concentrated latex paste of relatively high but variable concentration having a low protein content and including a stabilizer and preservative, and a powder comprising a high alumina cement that sets by hydration, a vulcanizing agent, an accelerator and an antioxidant, said paste and powder being mixed together in predetermined proportions to provide a self-setting plastic compound of the desired consistency.

7. A double-walled glass unit including two sheets of glass arranged in spaced substantially parallel relation and having arranged therebetween a layer of glass threads in contact with the adjacent sheet surfaces and associated with said sheets to provide a channel around the edges of the unit, and a plastic sealing material inserted within said channel and engaging the peripheral edges of the layer of glass threads, comprising a concentrated latex paste having a dry rubber content of approximately 68% to 70% and a stabilizer and preservative, and a cement powder containing approximately 97% alumina, a vulcanizing agent, an accelerator and an antioxidant, said paste and powder being mixed together in predetermined proportions to provide a self-setting plastic compound of the desired consistency.

8. A double-walled glass unit including two sheets of glass arranged in spaced substantially parallel relation and having arranged therebetween a layer of glass threads in contact with the adjacent sheet surfaces and associated with said sheets to provide a channel around the edges of the unit, and a plastic sealing material inserted within said channel and engaging the peripheral edges of the layer of glass threads, comprising a concentrated latex paste of relatively high but variable concentration having a low protein content and including a relatively small amount of a stabilizer and preservative selected from the group consisting of ammonia and caustic alkali, and a powder comprising a high alumina cement, a vulcanizing agent such as sulfur, an accelerator such as "Butyl Zimate" and an antioxidant such as "Age-rite White," said paste and powder being mixed together in predetermined proportions to form a self-setting plastic compound of the desired consistency.

9. A double-walled glass unit including two sheets of glass arranged in spaced substantially parallel relation and having arranged therebetween a layer of glass threads in contact with the adjacent sheet surfaces and associated with said sheets to provide a channel around the edges of the unit, and a plastic sealing material inserted within said channel and engaging the peripheral edges of the layer of glass threads, comprising a concentrated latex paste having a dry rubber content of approximately 68% to 70% and a stabilizer and preservative selected from the group consisting of ammonia and caustic alkali, and a powder comprising a high alumina cement, a vulcanizing agent such as sulfur, an accelerator such as "Butyl Zimate" and an anti-oxidant such as "Age-rite White," said paste and powder being mixed together in predetermined proportions to provide a self-setting plastic compound of the desired consistency.

10. A double-walled glass unit including two sheets of glass arranged in spaced substantially parallel relation and having arranged therebetween a layer of glass threads in contact with the adjacent sheet surfaces and associated with said sheets to provide a channel around the edges of the unit, and a plastic sealing material inserted within said channel and engaging the peripheral edges of the layer of glass threads, comprising a concentrated latex paste containing the following ingredients in the approximate proportions:

| | Per cent |
|---|---|
| Dry rubber | 68.45 |
| Water | 30 |
| Ammonia | 0.05 |
| Natural proteins | 0.8 |
| Caustic alkali (KOH) | 0.7 | and a dehydrating powder containing the following ingredients in the approximate proportions:

| | Per cent |
|---|---|
| High alumina cement | 97 |
| Sulfur | 1 |
| Accelerator ("Butyl Zimate") | .5 |
| Antioxidant ("Age-rite White") | 1.5 | said paste and powder being mixed together to form a self-setting plastic compound of the desired consistency.

11. A double-walled glass unit including two sheets of glass arranged in spaced substantially parallel relation and having arranged therebetween a layer of glass threads engaging the adjacent sheet surfaces and associated with said sheets to provide a channel around the edges of the unit, and a plastic sealing material inserted within said channel and engaging the peripheral edges of the layer of glass threads, said sealing material being of such character that upon setting it undergoes a certain amount of shrinkage, thereby stretching the glass threads adhered thereto to remove wrinkles therefrom.

ORMOND H. PADDOCK.